United States Patent [19]
Honda

[11] Patent Number: 5,850,297
[45] Date of Patent: *Dec. 15, 1998

[54] IMAGE READING APPARATUS FOR READING FIRST AND SECOND IMAGES

[75] Inventor: Takashi Honda, Toyokawa, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 615,137

[22] Filed: Mar. 25, 1996

[30] Foreign Application Priority Data

Mar. 27, 1995 [JP] Japan ................... 7-068091

[51] Int. Cl.⁶ .................................. H04N 1/04
[52] U.S. Cl. ........................... 358/474; 358/475
[58] Field of Search ................... 358/474–477, 358/487, 450, 408; 355/114, 127; 348/267, 588

[56] References Cited

U.S. PATENT DOCUMENTS

| | | | |
|---|---|---|---|
| 4,702,590 | 10/1987 | Usami | 355/14 C |
| 4,743,946 | 5/1988 | Nishimori et al. | 355/14 |
| 4,803,561 | 2/1989 | Kubota | 358/285 |
| 4,837,450 | 6/1989 | Satomura et al. | 250/571 |
| 4,855,789 | 8/1989 | Ogawa | 355/26 |
| 4,879,576 | 11/1989 | Naito | 355/214 |
| 4,929,972 | 5/1990 | Anderson et al. | 354/75 |
| 5,249,017 | 9/1993 | Kokura | 355/68 |
| 5,369,426 | 11/1994 | Jamzadeh | 346/157 |
| 5,400,152 | 3/1995 | Manico et al. | 358/501 |
| 5,414,535 | 5/1995 | Kanmoto et al. | 358/487 |
| 5,440,403 | 8/1995 | Hashimoto et al. | 358/444 |
| 5,522,657 | 6/1996 | Jamzadeh et al. | 358/302 |
| 5,754,922 | 5/1998 | Bessho | 399/52 |

FOREIGN PATENT DOCUMENTS

5-289180  11/1993  Japan .
6-113139  4/1994  Japan .

*Primary Examiner*—Scott Rogers
*Assistant Examiner*—Stephen Brinich
*Attorney, Agent, or Firm*—Burns, Doane, Swecker & Mathis, LLP

[57] ABSTRACT

An image reading apparatus that reads a first image and a second image which were photographed on a microfilm side by side in the width direction of the microfilm. The image reading apparatus has a reading device which reads the images on the microfilm, a parameter setting device which sets separately a first image processing parameter for the first image and a second image processing parameter for the second image, and a control device which controls the reading device to read the first image in accordance with the first image processing parameter and to read the second image in accordance with the second image processing parameter.

11 Claims, 8 Drawing Sheets

FIG. 12 duplex film

FIG. 13 images on front and rear surface on screen

5,850,297

IMAGE READING APPARATUS FOR READING FIRST AND SECOND IMAGES

BACKGROUND OF THE INVENTION

1. Field of the Invention

The present invention relates to an image reading apparatus such as a microfilm scanner.

2. Description of the Related Art

In the microfilm field a photographic method called a duplex method exists that reads images on the front surface and the rear surface of the same document onto a film side by side.

Figure 12:
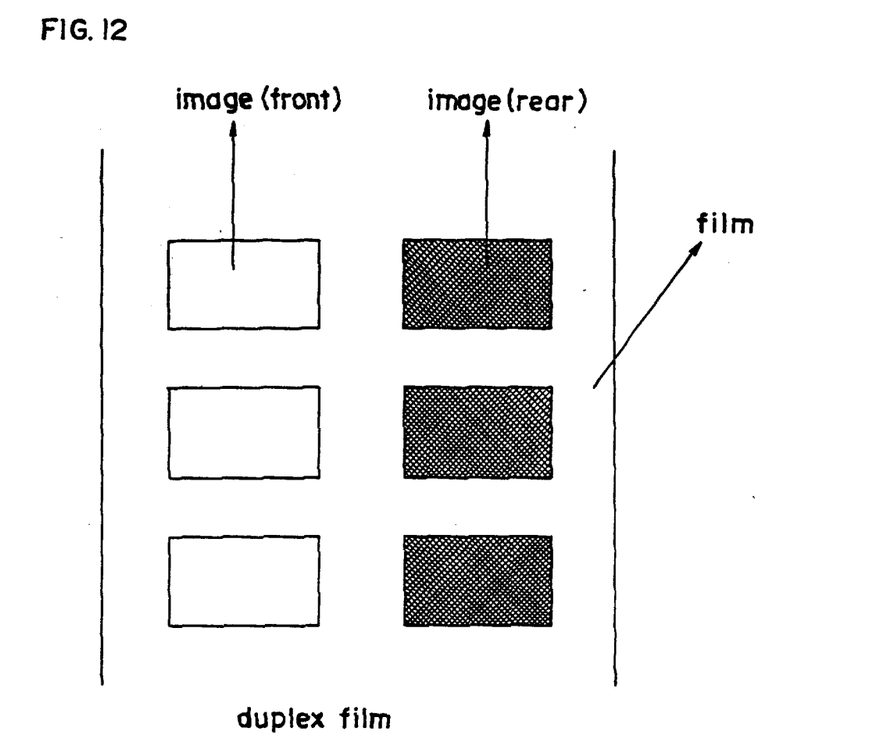
FIG. 12 is a model diagram showing duplex film projected onto a screen.

Normally, for film which is photographed by means of the duplex method (hereinafter referred to as duplex film), images on the front surface and the rear surface of the same document are read side by side in the width direction of the film by separate optical systems (see FIG. 12).

In duplex film, when comparing the density level of these images on the front surface and the rear surface of the same document which were read side by side, there is a possibility the density may not always be the same. This occurs when the density of the document itself is different between the front surface and the rear surface.

Figure 13:
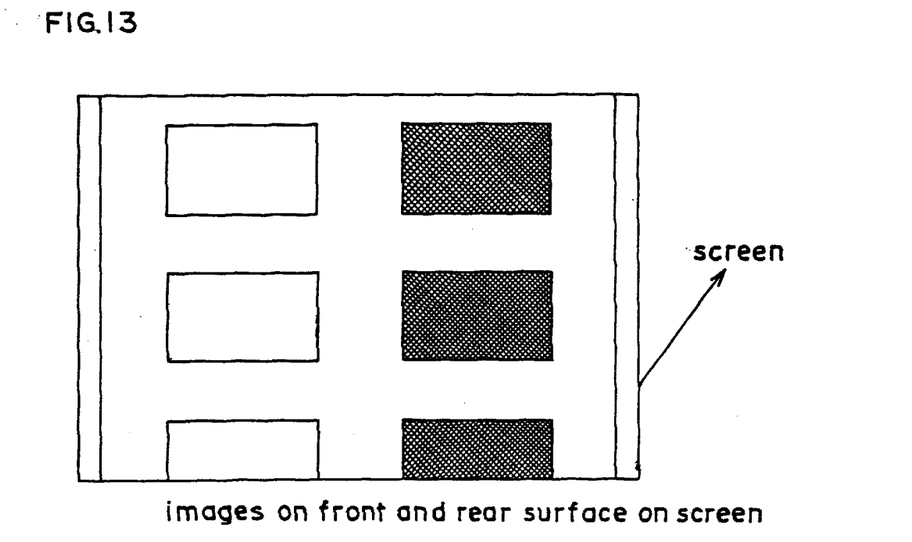
FIG. 13 is a conceptual diagram showing the density difference of images on the front and rear surfaces of duplex film.

For example, for a check, there are many cases in which the rear surface has letters written on a solid white paper surface compared to the front surface which has letters and signatures written on a colored paper surface on which a watermark design is printed. When this type of document is photographed by means of the duplex method, the density difference of the base of the document is transferred to the film as is (see FIG. 13).

Conventionally, when images on the front and rear surfaces of a document which have the above-mentioned density difference on the duplex film were read by an image reading apparatus such as a microfilm scanner, one histogram was created from the data in the entire reading range and then based on this histogram, image processing parameters including the exposure amount were set. In other words, for a conventional image reading apparatus, because the reading is carried out using image processing parameters with identical conditions with respect to two images which have a density difference, under-exposure occurred easily in either the image on the front surface or the image on the rear surface of the document and over-exposure in the other which made it difficult to read both images favorably.

In order to solve this type of problem, separately reading the image on the front surface and the image on the rear surface has been considered. However, there was a problem in which the reading operation is done twice in this method thus requiring more time to read the images thereby reducing the productivity.

SUMMARY OF THE INVENTION

The object of this invention is to provide an improved image reading apparatus that eliminates the above-mentioned problems.

Another object of this invention is to provide an image reading apparatus that can favorably read both of two images which have density differences.

Another object of this invention is to provide an image reading apparatus that can favorably read both of two images which have density differences without reducing the productivity namely, the reading speed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Referring now to the drawings, a preferred embodiment of the present invention will be explained.

Figure 1:
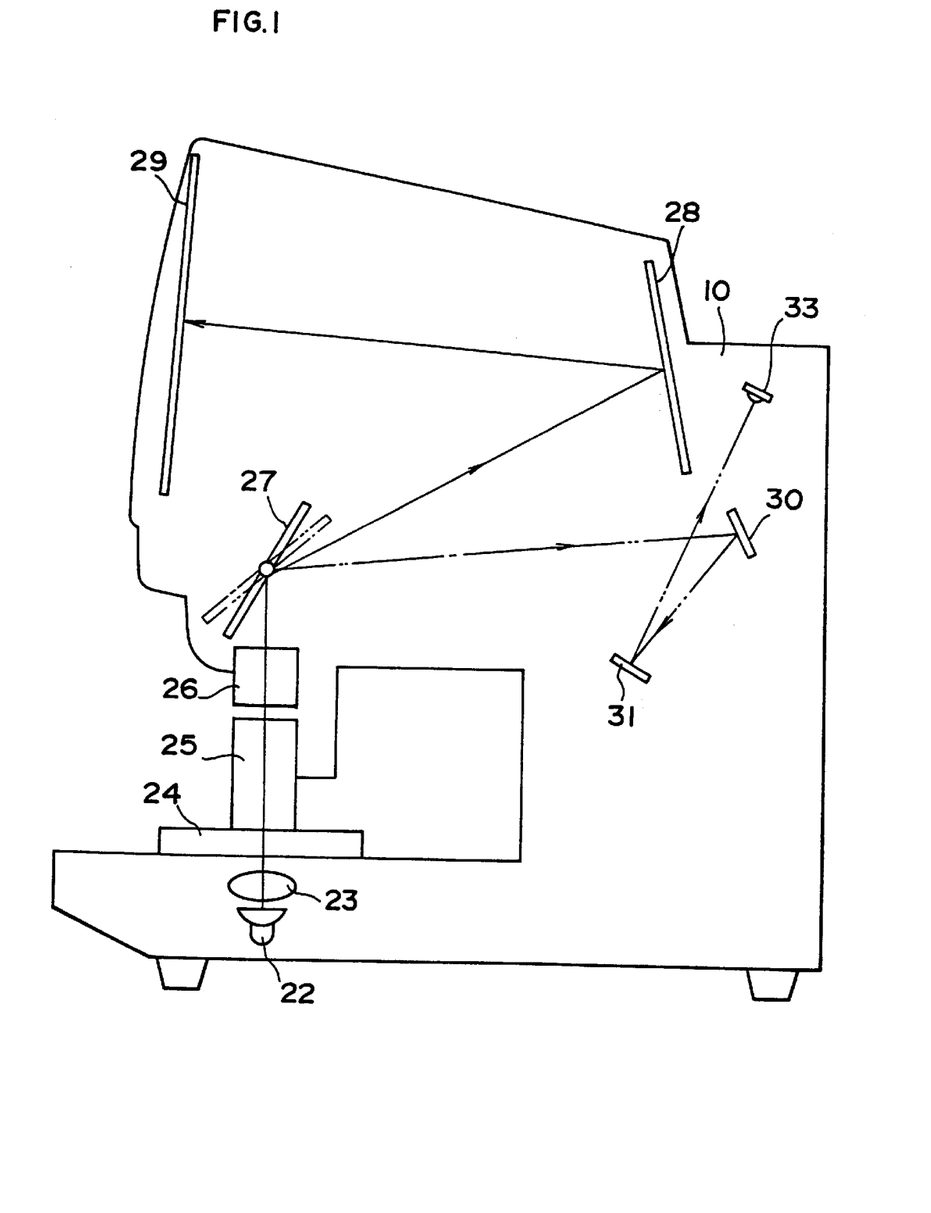
FIG. 1 is an outline diagram showing the overall construction of the microfilm scanner utilizing the present invention.

FIG. 1 is an outline diagram showing the overall construction of the microfilm scanner 10 that is the image reading apparatus utilizing the present invention.

In FIG. 1, the microfilm (not shown in the figure) is loaded onto a carrier 24 such that the lengthwise direction of the film is toward the depth direction in the figure. Light illuminated from a lamp 22 irradiates one portion of the microfilm set on the carrier 24 through a condenser lens 23. The light path indicated by the solid line in the figure shows the light path when an image is projected to a screen 29. When the image is projected, a mirror 27 is fixed at the position indicated by the solid line in the figure returning the transmission light of the microfilm through a lens 25 and a prism 26 to a mirror 28. The transmission light of the film is further returned by the mirror 28 and then is projected onto the screen 29. By this action, the image that is photographed on the microfilm is displayed on the screen 29. Moreover, when the image is projected, the film image is rotated 90 degrees by means of the prism 26 to adjust the direction of the image on the screen 29 (see FIG. 13).

The light path indicated by the chain double-dashed line in the figure shows the light path when an image is read by the CCD line image sensor (hereinafter referred to as simply CCD) 33. While the image is read, the mirror 27 moves from the position of the solid line to the position of the chain double-dashed line returning the transmission light of the microfilm to a mirror 30. The transmission light of the film is returned by mirror 30 and mirror 31 and is then projected onto a CCD 33 set extending in the depth direction in the figure. In this state, the film image is scanned and exposed on the CCD 33 by the rotation of the mirror 27, thereby reading the image photographed on the microfilm.

Figure 2:
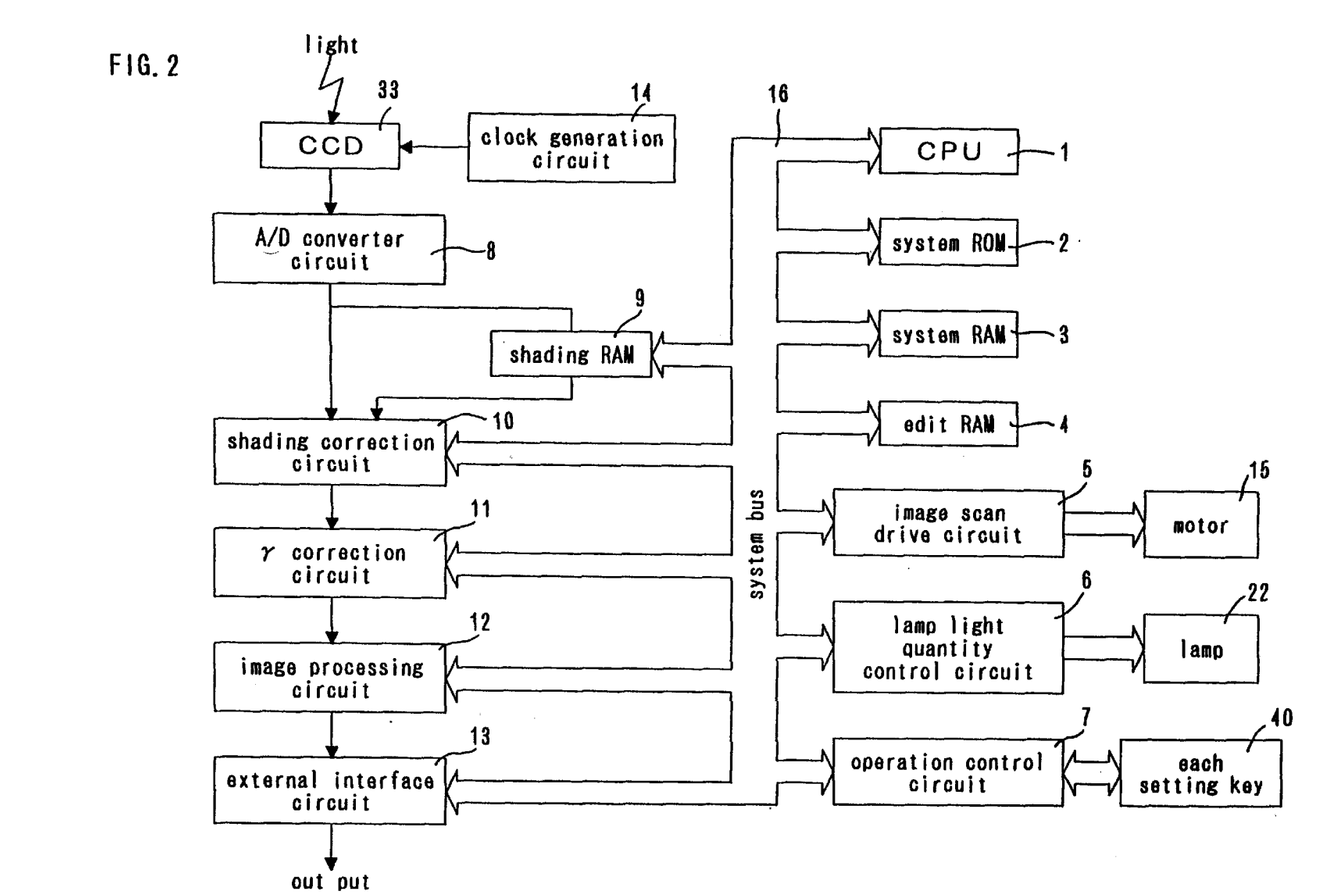
FIG. 2 is a block diagram showing the construction of the control system of the above-mentioned microfilm scanner.

FIG. 2 is a block diagram showing the construction of the control system of the microfilm scanner 10.

Referring now to FIG. 2, the operation of each portion of the control system will be described.

Each portion of the control system is connected by means of a system bus 16. When power is applied, a CPU 1 reads a control program stored inside a system ROM 2 and makes preparations for system operation. Further, the CPU 1 creates histograms and carries out calculations and settings of image processing parameters in a "check mode" described later.

An image scan drive circuit 5 is a control circuit to operate the mirror 27 while an image is being read. The CPU 1 determines the sub scan speed that changes variously due to changes in magnification or other factors and, in response to that result, the image scan drive circuit 5 operates a mirror operation motor 15 rotating the mirror 27.

A lamp light quantity control circuit 6 is a circuit to set the light quantity of lamp 22 to a brightness required for an image read. The CPU 1 determines the light quantity required when projecting the image to the screen, during the preliminary scan and during the actual scan, respectively. Then, the lamp light quantity control circuit 6 sets the light quantity of the lamp 22 in response to that result.

An operation control circuit 7 is a circuit that detects selection conditions such as function settings and changes made by input from each setting key 40 and then transfers that information to the CPU 1.

The CCD 33 photoelectrically converts the transmission light of the microfilm to be scanned and exposed during the image read and outputs an analog signal based on the image photographed on the microfilm. The analog signal from the CCD 33 is converted into an 8-bit digital signal by means of an A/D converter circuit 8.

A shading correction circuit 10 is a circuit that corrects the digital data of each pixel obtained by the A/D converter circuit 8 based on data (stored inside shading RAM 9) on which white/black data correction was carried out with respect to each pixel of the CCD 33.

A γ correction circuit 11 is a circuit that converts the digital output value after the A/D conversion which is normally changed to an exponential function with respect to the film density such that the digital output value becomes a linear value with respect to the film density.

An image processing circuit 12 is a circuit that carries out image processing such as setting an edit RAM 4 with respect to the output region, inverting between positive and negative, and edge emphasis processing.

The signal after undergoing image processing is output to an external device through an external interface (I/F) 13.

The microfilm scanner 10 comprising the above-mentioned construction has a "check mode" for reading duplex film. When this mode is selected by the operator, read control is executed to improve the image reproducibility without impairing the productivity (reading speed) in the read of duplex film in which there is a possibility of density differences between the image on the front surface and the image on the rear surface.

Figure 3:
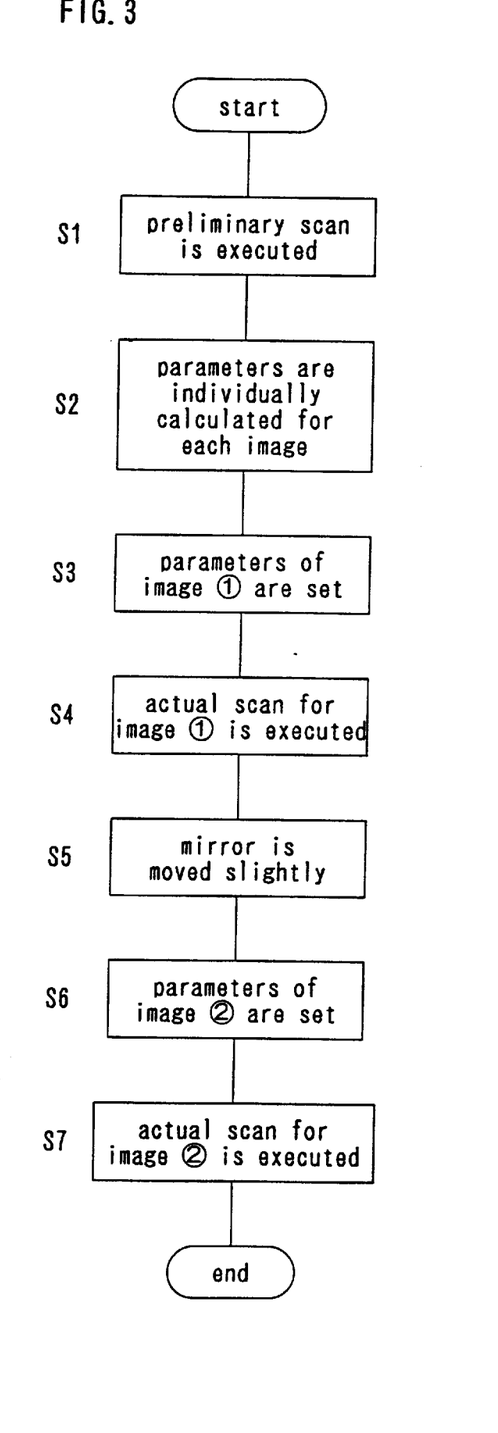
FIG. 3 is a flowchart showing details of the process when the "check mode" is set.
Figure 4:
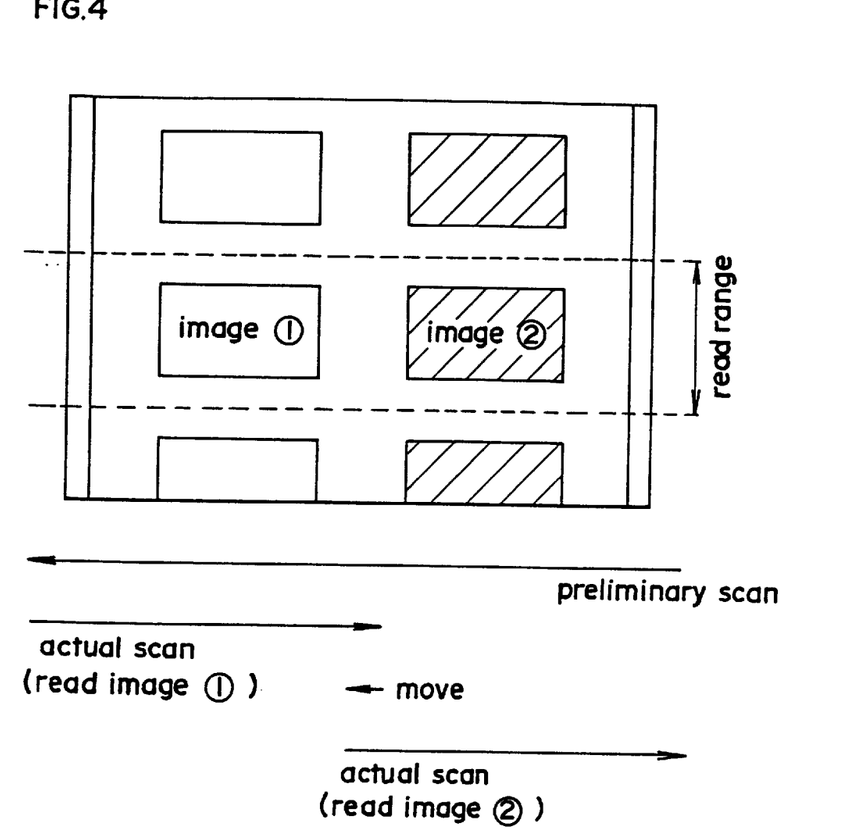
FIG. 4 is a conceptual diagram showing the read operation when the "check mode" is set.

FIG. 3 is a flowchart showing details of the process of the CPU 1 when the "check mode" is set. FIG. 4 is a conceptual diagram showing the read operation when the "check mode" is set.

The image read carried out by the "check mode" consists of a preliminary scan (S1), a parameter calculation for each image (image (1) and image (2)) on the front and rear surfaces (S2), parameter settings for each image (S3, S6), actual scans for each image (S4, S7), and a slight movement of the mirror 27 (S5). While referring to FIG. 3, the procedure of the process will be described below.

If an image read is specified by the operation keys (not shown in the figure) among the various setting keys 40 (see FIG. 2) when the "check mode" has been set using another keys not shown in the figure, at first, in step S1 (hereinafter 'step' omitted) a preliminary scan is executed in order to obtain information such as the-density and contrast of the region on the film to be read. Moreover, at this point in the process, the read range (see FIG. 4) that includes image (1) and image (2) which are the images on the front and rear surfaces of the same document photographed on duplex film are scanned and image (1) and image (2) are read.

In the preliminary scan, the lamp light quantity, scan speed, and the transmission rate-density conversion (γ-curve) are initially set for the preliminary scan.

The lamp light quantity is set to a light quantity just short of the saturation state of the CCD 33 output without any film in order to cover the film density in a range as wide as possible.

For the scan speed the sub scan speed is set such that data is obtained at the desired sampling pitch. Because the preliminary scan is a scan that finds the trends related to the density of the read range, it is not necessary to read all the data in the read range allowing the data to be read at an approximate sampling pitch (for example, every 1 mm).

Figure 5:
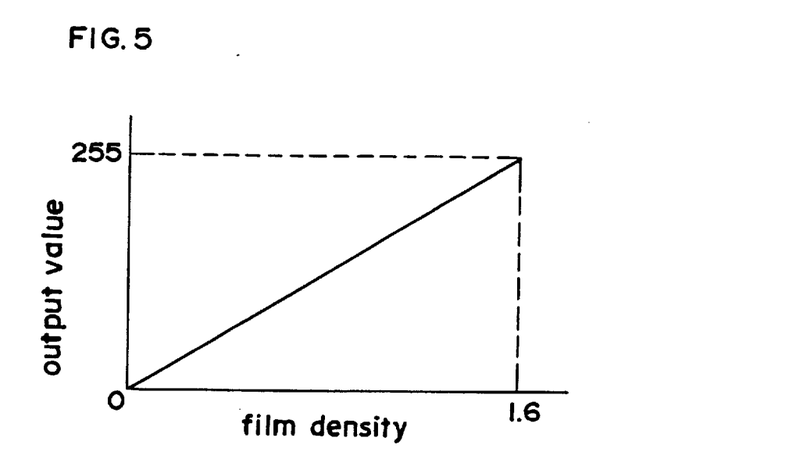
FIG. 5 shows one example of a γ-curve used during a preliminary scan.

The transmission rate-density conversion (γ-curve) is for converting the linear CCD output with respect to the transmission rate (luminous intensity on the surface of the CCD) to a linear output with respect to the density. During the preliminary scan, the slope of the γ-curve is made smaller to allow a wide range of film densities to be recognized to a certain extent. For example, if the γ-curve shown in FIG. 5 is used, a linear digital output value of 0 to 255 is obtained with respect to a film density of 0 to 1.6.

As shown by the arrow in FIG. 4, after setting the above-mentioned parameters, a preliminary scan is executed for the entire read range by means of the mirror 27 being made to rotate. The data obtained by the preliminary scan is stored in one portion of the system RAM 3.

When the preliminary scan completes, in step S2, parameters for the actual scan are individually calculated with respect to image (1) and image (2) based on the data obtained in the preliminary scan.

Figure 6:
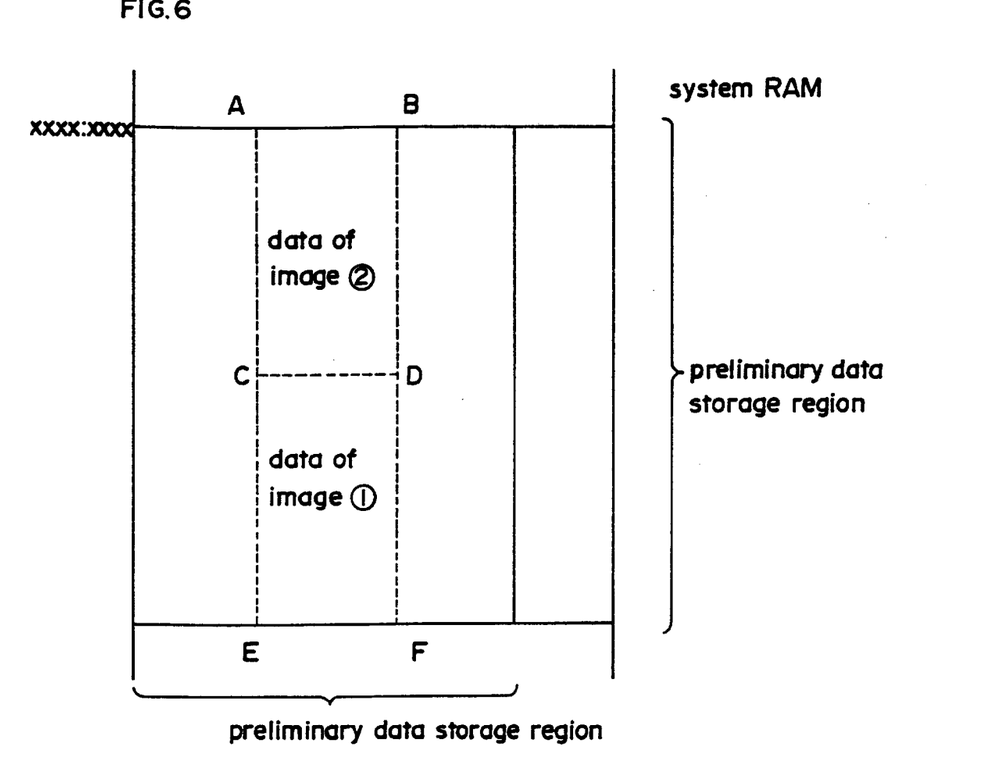
FIG. 6 is a conceptual diagram showing the preliminary scan data storage region in system RAM.

After the preliminary scan is executed, the sampling data of the entire read range is stored in system RAM 3 in the arrangement shown in FIG. 6. Here, the images (image (1) and image (2)) which are the targets of the read are assumed to be arranged at the center in the lengthwise direction of the read range of the film and, assuming a check is used, arranged within a read range of approximately 4 inches in the axial direction of the film. Therefore, the preliminary scan data region that calculates the parameters used for the actual scan for image (1) uses memory coordinates "CDEF" shown in FIG. 6. In like manner, image (2) uses memory coordinates "ABCD"

Based on these two preliminary scan data ("CDEF", "ABCD"), the parameters. used. for the actual scan are calculated for both image (1) and image (2) using the procedure below.

(1) Creating a Histogram

Figure 7:
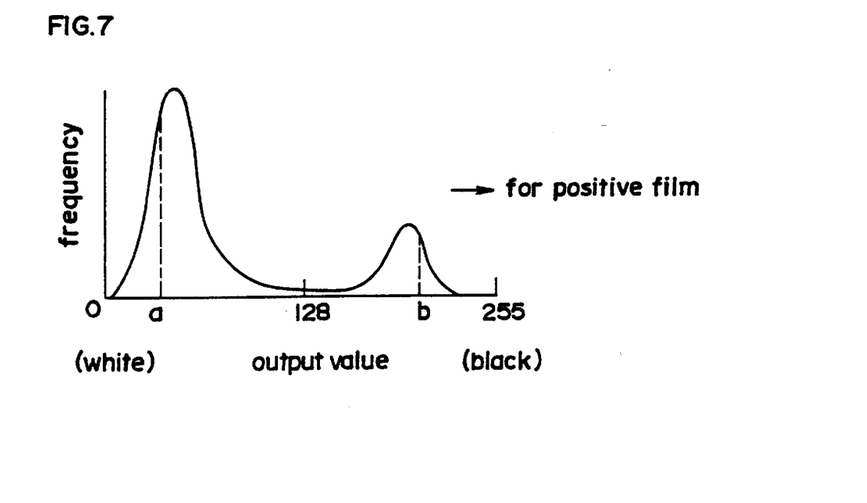
FIG. 7 shows one example of a histogram created based on preliminary scan data.

Examines the appearance frequency for every digital output value (0 to 255) for the preliminary scan data. FIG. 7 shows one example of a histogram created based on this (for positive film).

(2) Calculating Image Portion Density and Base Portion Density

Analyzes the histogram created in above-mentioned (1) to obtain the image portion density (Dimg) and base portion density (Dbas) of the image region. For FIG. 7, assuming that from among the two peaks, the area close to the peak with the smaller output value reflects the output value of the base portion and the area close to the peak with a larger output value reflects the output value of the image portion, the values of a and b which were shifted a fixed value from each peak are determined to the base portion density (Dbas) and the image portion density (Dimg), respectively. The values of a and b are converted to density values using equation (1) and equation (2) below.

$$Dbas=(1.6/255) \times a \quad (1)$$

$$Dimg=(1.6/255) \times b \quad (2)$$

(3) Calculating Contrast and Threshold Value Density

Based on the image portion density (Dimg) and base portion density (Dbas) obtained in above-mentioned (2), calculates the contrast (Dcnt) and threshold value density (Dthr) using equation (3) and equation (4) below.

$$Dcnt=|Dbas-Dimg| \quad (3)$$

$$Dthr=(Dbas+Dimg) \quad (4)$$

(4) Selecting γ-curve

Prepares a γ-curve used for the actual scan that has a plurality of slopes in order to intensify the contrast of the output image after γ correction and selects a γ-curve which obtains a favorable image reproduction from the contrast obtained in above-mentioned (3).

Figure 8:
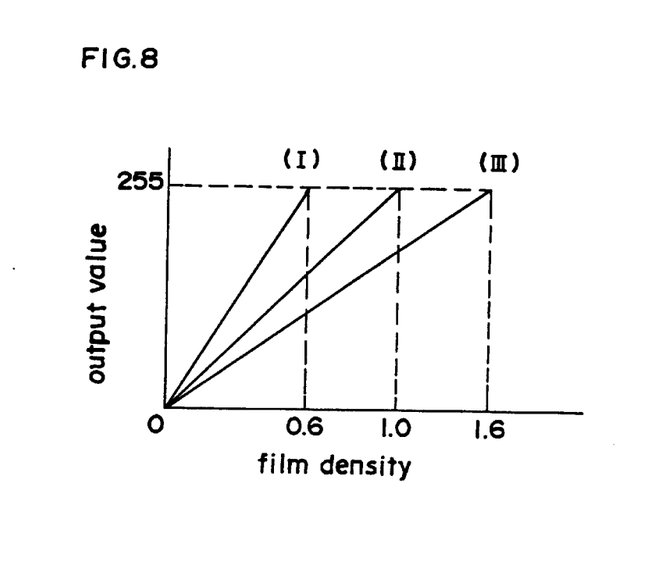
FIG. 8 shows one example of γ-curve which is selectively set during an actual scan.

For example, when the three types of γ-curve shown in FIG. 8 can be selected for positive film, the selection is made as shown below in response to the value of the contrast (Dcnt).

When $Dcnt \leq 0.8$, select γ-curve (I).

When $0.8 < Dcnt \leq 1.2$, select γ-curve (II).

When $1.2 < Dcnt$, select γ-curve (III).

(5) Calculating Exposure Amount

Obtains and sets the lamp light quantity namely, the exposure amount, during the actual scan based on the threshold value density (Dthr) obtained in above-mentioned (3).

Figure 9:
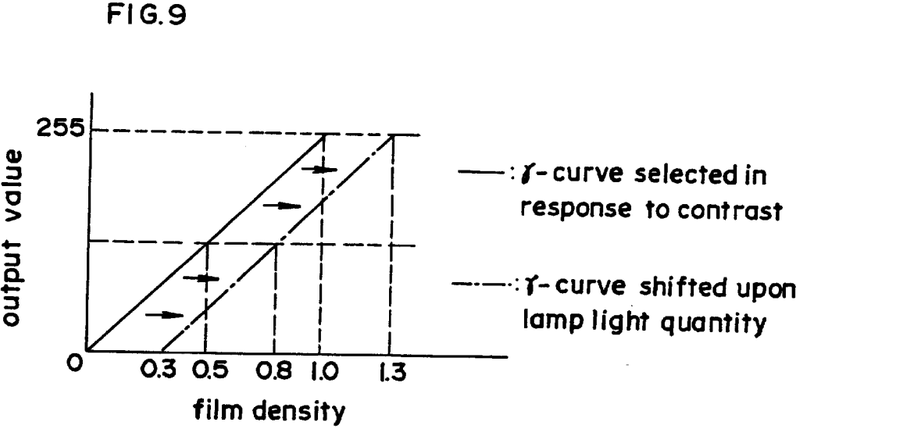
FIG. 9 shows one example of a shift in a γ-curve during an actual scan.

At first, a film density (Davr) is obtained that corresponds to the digital center value (=128) in the γ-curve selected in above-mentioned (4). Because the operation to change the lamp light quantity shifts (parallel movement that does not change the slope of γ) the selected γ-curve, the lamp light quantity is set such that the threshold value density (Dthr) obtained in above-mentioned (3) is equal to this film density (Davr). In other words, if the same lamp light quantity is set in the actual scan as in the preliminary scan, an image is reproduced in the density range of the γ-curve thus, the lamp light quantity is set such that the reproduction range shifts by only the density difference given by [Davr−Dthr] with respect to that light quantity (see FIG. 9).

By carrying out the processes described above for both image (1) and image (2), the separate parameters for both image (1) and image (2) are calculated. The values of the parameter calculation which were calculated for image (1) and image (2) are stored separately in system RAM 3.

Next, in S3, the parameters for the actual scan of image (1) are set based on the parameters calculated in S2. In the foregoing example, the settings for the γ-curve and the lamp light quantity were carried out.

After the parameters are set, the mirror 27 is made to rotate in the direction opposite to the rotational direction during the preliminary scan so that the actual scan is executed for image (1) (S4). As shown in FIG. 4, in the actual scan for this image (1) the read starts from the left edge of the read range and ends at a location that slightly overruns the center of the range.

When the actual scan of image (1) completes, the mirror 27 is returned by only the overrun quantity during the read of image (1) and the drive control quantity for the read of the next image (2) (S5).

Next, in S6, the parameters for the actual scan of image (2) are set in like manner to the parameters for image (1) in S3.

After the parameters are set, the actual scan for image (2) is executed (S7). As shown in FIG. 4, in the actual scan for this image (2) the read starts from the position returned to in S5 and ends at a location that slightly overruns the right edge of the read range.

According to the microfilm scanner 10 of this embodiment, even if there is a density difference between images on the front and rear surface of the same document photographed on duplex film, both images can be favorably read by means of the above-mentioned read control. Further, this scanner has the advantage of higher productivity namely, read speed, because the images are read by one read operation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, during the actual scan of image (1) in this embodiment, after the center portion of the read range is slightly overrun, the read of image (2) is started after the mirror 27 is returned by that amount of overrun only. This causes an overrun that allows image (1) to be completely read when image (1) is photographed in a state shifted from the center portion toward image (2). Further, in contrast to this, when image (2) is shifted toward image (1), this starts the read of image (2) after the mirror 27 is returned by a slight amount such that the image is read completely. Moreover, this is also significant as preparatory time to convert the parameters for the actual scan of image (1) to parameters for the actual scan of image (2). For example, although some response time is necessary to change the lamp light quantity, the change of this lamp light quantity is completed while the mirror 27 is returning. Therefore, if the above-mentioned image shifting or response speed of the lamp do not become problems, the read of image (1) and image (2) can be continuously carried out without any overrun in the center portion of the read range or return action. For this case, the return action of the mirror becomes unnecessary thereby further shortening the time required to read the image.

Furthermore, although the type of microfilm scanner 10 that was described in this embodiment is one that scans images by means of mirrors, this invention is not restricted to this mirror scanning type and can be applied to other types of scanners including one that directly scans and reads images photographed on a screen by means of an image sensor for example.

Figure 10:
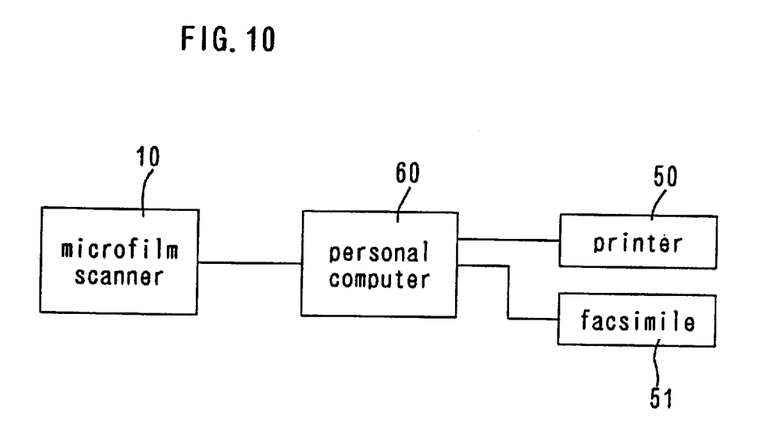
FIG. 10 is a model diagram showing an example of the system construction of the above-mentioned microfilm scanner connected to an external output device via a personal computer.
Figure 11:
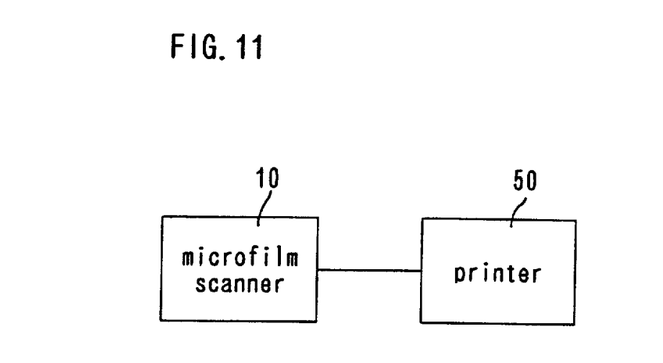
FIG. 11 is a model diagram showing an example of the system construction of the above-mentioned microfilm scanner directly connected to an external output device.

Even further, as shown in FIG. 10 and FIG. 11, the microfilm scanner 10 of this embodiment is also connected to output devices such as a printer 50 or a facsimile 51 via a personal computer 60 or directly. Images read by means of the microfilm scanner 10 are output by these output devices. However, it is obvious that this invention can also be applied to the construction of devices which integrate an image reading apparatus and output device like, for example, a micro reader printer.

Furthermore, this invention can be applied to an apparatus to read images recorded on a medium other than microfilm including an apparatus to read photographic film within the scope of the invention.

What is claimed is:

1. An image reading apparatus that reads a first image and a second image which were photographed on a microfilm side by side in the width direction of the microfilm, comprising:
    a scanner having a light source for scanning the images on the microfilm;
    a parameter setting means for setting separately first image processing parameters including a first light source quantity for the first image and second image processing parameters including a second light source quantity for the second image based on density data obtained during one preliminary scan by the scanner;
    a memory for storing the first image processing parameters and the second image processing parameters;
    means for reading the stored first and second image processing parameters; and
    a control means for controlling the scanner to scan the first image with the light source in accordance with the first light source quantity and to scan the second image in accordance with the second light source quantity during one actual scan pass such that a quantity of light emitted from the light source is changed during the one actual scan pass.

2. An image reading apparatus as claimed in claim 1, wherein said scanner scans a read range on the microfilm including said first and second images from one end portion to the other end portion thereof for the preliminary scan, and scans said read range for the one actual scan pass in the opposite direction of the preliminary scan.

3. An image reading apparatus as claimed in claim 1, wherein the image reading apparatus is provided with a histogram creation means for creating separately a first histogram based on a density of the first image and a second histogram based on a density of the second image, and said parameter setting means sets the first image processing parameter based on the first histogram and the second image processing parameter based on the second histogram.

4. An image reading apparatus as claimed in claim 1, wherein said parameter setting means selects as said first and second image processing parameters a γ-curve for converting the read image density data obtained by the preliminary scan to density image data among a plurality of γ-curves each of which represent a relationship between the read image density data obtained by the preliminary scan and the density image data.

5. An image reading apparatus as claimed in claim 1, wherein said first and second images are images on the front surface and the rear surface of a same document.

6. An image reading apparatus that reads a first image and a second image which were recorded on recording medium, comprising:
    a reading means for reading the images on the recording medium, which includes a scanning means for scanning the first and second images on the recording medium;
    a parameter setting means for setting separately first image processing parameters including a first light source quantity for the first image and second image processing parameters including a second light source quantity for the second image based on density data obtained by one preliminary scan operation of said scanning means;
    a memory for storing the image processing parameters for the first image and the second image processing parameters for the second image;
    means for reading the stored first and second image processing parameters; and
    a control means for controlling the reading means to read the first image in accordance with the first light source quantity and to read the second image in accordance with the second light source quantity during one actual scan pass of said scanning means following to the preliminary scan such that a quantity of light emitted from the light source is changed during the one actual scan pass.

7. An image reading apparatus as claimed in claim 6, wherein said scanning means scans a read range on the recording medium including said first and second images from one end portion to the other end portion thereof for the preliminary scan, and scans said read range for the actual scan in the opposite direction of the preliminary scan.

8. An image reading apparatus as claimed in claim 6, wherein the image reading apparatus is provided with a histogram creation means for creating separately a first histogram based on a density of the first image and a second histogram based on a density of the second image according to the data obtained by the one preliminary scan operation of said scanning means, and said parameter setting means sets the first image processing parameters based on the first histogram and the second image processing parameters based on the second histogram.

9. A method of reading a first image and a second image which were recorded on the recording medium, comprising the following steps of:
    preliminarily scanning an entire read range on the recording medium including said first and second images to obtain density data;
    setting separately a first image processing parameter including a first image light source quantity for the first image and a second image processing parameter including a second image light source quantity for the second image based on the denisty data obtained by the preliminary scanning;
    storing said first image light source quantity and said second image light source quantity;
    changing a light source quantity while scanning said entire read range by reading the first image in accordance with the stored first image light source quantity and the second image in accordance with the stored second image light source quantity.

10. A method of reading a first image and a second image which were recorded on the recording medium as claimed in claim 9, wherein the preliminary scan is carried out from the one end portion of said read range to the other end portion thereof, and the changing of the light source quantity while scanning is carried out in the opposite direction of the preliminary scan.

11. A method of reading a first image and a second image on a recording medium, comprising:
    completing one preliminary scan of said first image and said second image with a scanner having a light source to obtain preliminary data;

setting a first image light source quantity setting for the first image and a second image light source quantity setting for the second image based on the preliminary data obtained from the preliminary scan; and performing one final scan pass to scan the first image and the second image, during the one final scan pass the light source illuminates the first image according to the first image light source quantity setting and illuminates the second image according to the second image light source quantity setting.

* * * * *